United States Patent
Edmiston et al.

(10) Patent No.: US 9,438,537 B2
(45) Date of Patent: Sep. 6, 2016

(54) METHOD FOR CUT THROUGH FORWARDING DATA PACKETS BETWEEN ELECTRONIC COMMUNICATION DEVICES

(75) Inventors: Graham Edmiston, Bridge of Weir (GB); Hezi Rahamim, Ramat Gan (IL); Amir Yosha, Rishon le Zion (IL)

(73) Assignee: Freescale Semiconductor, Inc., Austin, TX (US)

( * ) Notice: Subject to any disclaimer, the term of this patent is extended or adjusted under 35 U.S.C. 154(b) by 6 days.

(21) Appl. No.: 14/406,954

(22) PCT Filed: Jul. 3, 2012

(86) PCT No.: PCT/IB2012/053383
§ 371 (c)(1),
(2), (4) Date: Dec. 10, 2014

(87) PCT Pub. No.: WO2014/006448
PCT Pub. Date: Jan. 9, 2014

(65) Prior Publication Data
US 2015/0110126 A1    Apr. 23, 2015

(51) Int. Cl.
*H04L 12/28*    (2006.01)
*H04L 12/861*   (2013.01)
*H04L 12/721*   (2013.01)

(52) U.S. Cl.
CPC .............. *H04L 49/90* (2013.01); *H04L 45/66* (2013.01); *H04L 49/9063* (2013.01)

(58) Field of Classification Search
CPC .... H04L 49/90; H04L 45/66; H04L 49/9063
See application file for complete search history.

(56) References Cited

U.S. PATENT DOCUMENTS

| 6,980,552 | B1 * | 12/2005 | Belz ................. H04L 12/5693 370/392 |
| 7,000,031 | B2 | 2/2006 | Fischer et al. |
| 7,398,339 | B1 | 7/2008 | Davis et al. |
| 7,406,106 | B2 | 7/2008 | Mallory |
| 7,602,712 | B2 | 10/2009 | Johnsen et al. |
| 7,769,015 | B2 * | 8/2010 | Huang ................. H04L 49/90 370/389 |

(Continued)

FOREIGN PATENT DOCUMENTS

JP     2011010065 A    1/2011

OTHER PUBLICATIONS

International Search Report and Written Opinion correlating to PCT/IB2012/053383 dated Feb. 18, 2013.

*Primary Examiner* — Hassan Kizou
*Assistant Examiner* — Abdelnabi Musa

(57) ABSTRACT

An electronic device communicates according to a network protocol that defines data packets, for example EtherCAT. The device has a processor for performing input control on incoming data packets and performing output control on outgoing data packets, and a shared FIFO buffer comprising a multiuser memory. An input unit receives input data, detects the start of a respective data packet, subdivides the data packet into consecutive segments, one segment having a predetermined number of data bytes, and transfers the segment to the FIFO buffer before the next segment has been completely received. The processor accesses, in the input control, the multiuser memory for processing the segment, and, in the output control, initiates outputting the output packet before the corresponding input data packet has been completely received. An output unit transfers the segment from the FIFO buffer, and transmits the segment to the communication medium.

20 Claims, 5 Drawing Sheets

(56) References Cited

U.S. PATENT DOCUMENTS

| | | |
|---|---|---|
| 8,036,216 B1 | 10/2011 | Wang |
| 2004/0066782 A1 | 4/2004 | Nassar |
| 2005/0058149 A1 | 3/2005 | Howe |
| 2006/0114907 A1 | 6/2006 | Wu |
| 2006/0268913 A1* | 11/2006 | Singh .................... H04L 49/90 370/412 |
| 2008/0019395 A1 | 1/2008 | Aithal |
| 2010/0325370 A1 | 12/2010 | Cummings et al. |
| 2012/0159062 A1 | 6/2012 | Aybay |
| 2013/0250767 A1* | 9/2013 | Zhong ................. H04L 47/193 370/235 |

* cited by examiner

METHOD FOR CUT THROUGH FORWARDING DATA PACKETS BETWEEN ELECTRONIC COMMUNICATION DEVICES

FIELD OF THE INVENTION

This invention relates to electronic communication devices, such as master and slave packet forwarding devices, coupled via a network interface, and a method of communicating. More specifically, the invention is in the field of cut through forwarding of packets.

In the field of computer networking, cut-through forwarding, also known as cut-through switching, is a switching method for packet switching systems in which a network switch starts forwarding a frame (or packet) before the whole frame has been received by the network switch. Such a forwarding operation is performed typically as soon as the destination address has been processed. In this manner, cut-through forwarding enables the latency through the switch to be significantly reduced. The use of cut-through forwarding is an important feature of packet orientated deterministic automation systems. Furthermore, the implementation of such systems is expanding in the industrial market, and the technique is increasingly finding its way into solutions for the home, medical, networking and automotive applications.

Cut-through forwarding systems typically require tight control over the latency of a switch (which is the delay between data being received by the switch and that data subsequently being transmitted (forwarded on) by the switch) and jitter (which is the variance in time periods between reception and the transmission of the same frame) in order to ensure deterministic behaviour and scalability. Typically, such latency/jitter requirements differ between different cut-through 'modes' (for example, between different packet switching protocols). For example, such cut-through modes might include, by way of example, Ethernet protocols such as EtherCAT (Ethernet for Control Automation Technology), ProfiNET, IEC62439, DLR (Device Level Ring) or a cut through switch for IP traffic. Control over latency and jitter is of particular importance for cut-through forwarding modes that involve Ethernet frames and the like, in which frames are unpredictably spaced and may be seconds apart or back to back, unlike, say, Voice over IP (VoIP) which has predictable frame spacing. In order for a cut-through switch to be competitive in the market place, it must be capable of supporting such deterministic behaviour and scalability across multiple cut-through switching modes.

BACKGROUND OF THE INVENTION

United States patent application US 2008/0019395 describes expedited communication traffic handling. A traffic block that includes an amount of communication traffic that has been received on a receive communication link at a receive rate is to be transmitted on an output communication link at an output rate. A determination is made as to whether transmission of the traffic block at the output rate would be completed before a remaining amount of communication traffic to be included in the traffic block is received at the receive rate. Transmission of the traffic block is started, before all of the traffic that is to be included in the block is received, if transmission of the traffic block at the output rate would not be completed before the remaining amount of communication traffic is received.

Conventionally, tight control of latency and jitter may be provided by way of dedicated hardware blocks that are arranged to meet specific latency and jitter requirements. The use of such dedicated hardware blocks on a single device leads to a relatively expensive and inflexible solution. In particular, in order for a given switch to be able to meet the requirements of more than one cut-through mode, a separate, dedicated hardware block is required for each cut-through mode, thereby resulting in a significant increase in cost, power consumption and real estate requirements for the switch.

A problem of the device known from US 2008/0019395 is that incoming data is first received in a receiver unit, subsequently processed in a transmission block advancing system and then stored in a transmission buffer. Such a processing system causes latency and jitter when transferring the incoming data into outgoing data.

SUMMARY OF THE INVENTION

The present invention provides an electronic device, and a method, as described in the accompanying claims.

Specific embodiments of the invention are set forth in the dependent claims. Aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Figure 1:
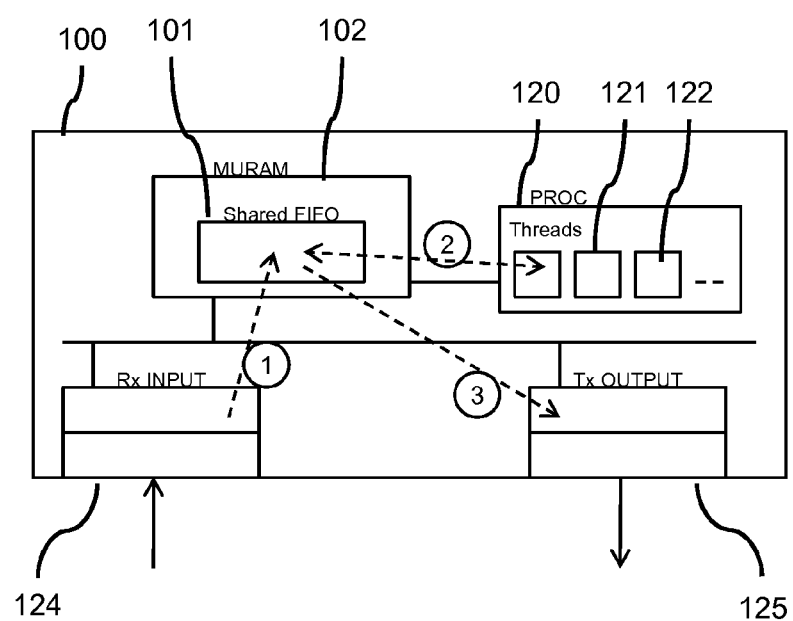
FIG. 1 shows an example of a device for data communication having a shared FIFO buffer.

FIG. 1 shows an example of a device for data communication having a shared FIFO buffer. An electronic device 100, has an input unit 124 (RX INPUT) and an output unit 125 (TX OUTPUT), a shared First In First Out (FIFO) buffer 101 and a processor (PROC) 120. The input unit, output unit and processor are connected to a Multi User Random Access Memory (MURAM) 102, which MURAM contains the FIFO buffer. The processor is provided with an input control 121 and an output control 122, which may be constituted by threads in programmed part of the processor. It is noted that the MURAM is local memory and may be formed by any suitable type of memory, e.g. SRAM, and accessing circuitry.

The device is a network device for communicating with other such devices according to a network protocol via a communication medium, e.g. Ethernet. The network protocol defines the communication, including data packets comprising data bytes having a predetermined structure including a packet header, e.g. the EtherCAT protocol.

A detailed example of a previously known communication device is described in the document: "Hardware Data Sheet EtherCAT ET1100 Slave Controller, Version 1.6, Date: 2009-08-28, by Beckhoff". The document also describes the known network protocol EtherCAT, in particular reference is made to chapters 1, 2 and 3.

The device for data communication shown in FIG. 1 functions as follows. The processor is arranged for performing input control 121 on incoming data packets and performing output control 122 on outgoing data packets. The input of the FIFO buffer is coupled to the input unit 124 and the output of the FIFO buffer is coupled to the output unit 125. The FIFO buffer is shared between the input control and the output control via the multiuser memory 102.

The input unit 124 functions, in operation, as follows. Input data including incoming data packets is received from the communication medium. The communication medium may be a network cable, coupled via a physical interface in the input unit to access the medium, also called a medium access controller (MAC). Signals from the physical interface are converted into data bytes, which are stored in a small buffer, e.g. a hardware data byte FIFO, in the input unit. The input data on the communication medium is analyzed to detect the start of a respective data packet, e.g. indicated by a specific signal such as a frame delimiter. The input unit subdivides the data bytes of the respective data packet into consecutive segments. A segment has a predetermined number of data bytes, and when that number of bytes has been received the segment is completed. Next the segment is transferred to the FIFO buffer as indicated by the dashed arrow marked 1, i.e. before the next segment has been completely received.

The processor 120 functions, in operation, as follows. The input control 121 accesses the multiuser memory MURAM 102, for processing the segment, as indicated by the dashed arrow marked 2. Thereto the input control part, e.g. a thread in a program of a RISC processor, is activated by the segment data entering the shared FIFO 101. Thereto a dedicated signal from the input unit may be coupled to the processor, or the processor may monitor the contents of the shared FIFO 101. In an embodiment of the device the processor is a RISC processor.

The output unit functions, in operation, as follows. The output unit is triggered by the output control 122 that a segment is ready for transfer. Subsequently, the output unit transfers the segment from the FIFO buffer to the output unit, as indicated by the dashed arrow marked 3. The output control 122 initiates outputting the output packet before the corresponding input data packet has been completely received. Moreover the output control 122 will begin transmission before the next segment has been fully received in the input unit 124. Finally the segment is transmitted to the communication medium.

Figure 2:
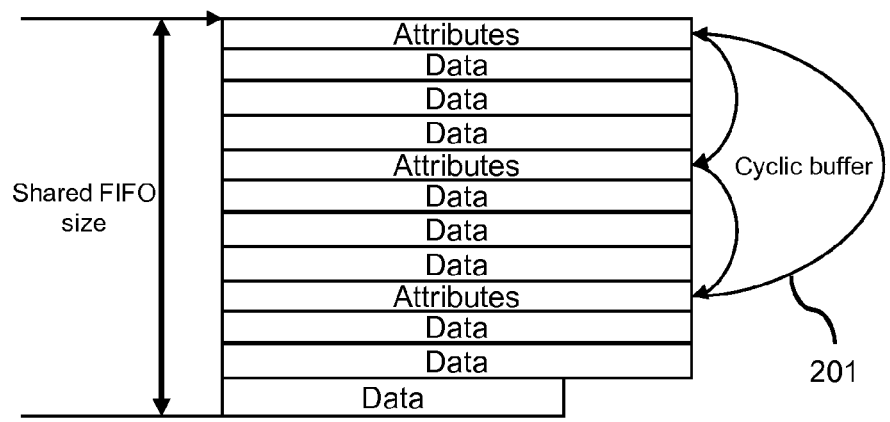
FIG. 2 shows an example of content of a shared FIFO buffer.

FIG. 2 shows an example of content within a shared FIFO buffer. The Figure schematically shows the contents of the FIFO buffer, which is a cyclic buffer as indicated by arrows 201. The shared size of the FIFO buffer contains a number of data segments, as indicated by a stack of memory locations, some of which contain a data segment (indicated by Data); while other contain metadata (indicated by Attributes). In this example the input unit is arranged for prepending metadata to the segment, and transferring the metadata with the segment to the FIFO buffer. Subsequently, the processor is arranged for processing the metadata by accessing the MURAM. For example, upon receiving the metadata contains an Rx status for the packet and the physical interface. After the segment has been processed the metadata is programmed by the RISC engine to contain contents that the transmit hardware needs. A good example of this content is a bit indicating that this segment is first segment of a new frame thus the hardware must send the start of frame preamble and SFD before sending the data portion of this segment.

In an example of the network protocol, the incoming packets correspond to data on a Data Link layer according to an ISO layer 2 network protocol. Furthermore, the start of a respective data packet may be a directly after a preamble and/or Start of Frame Delimiter [SFD] on the physical layer according to an ISO layer 1 network protocol. In a practical example, the data segments have a size of 8 data bytes.

Figure 3:
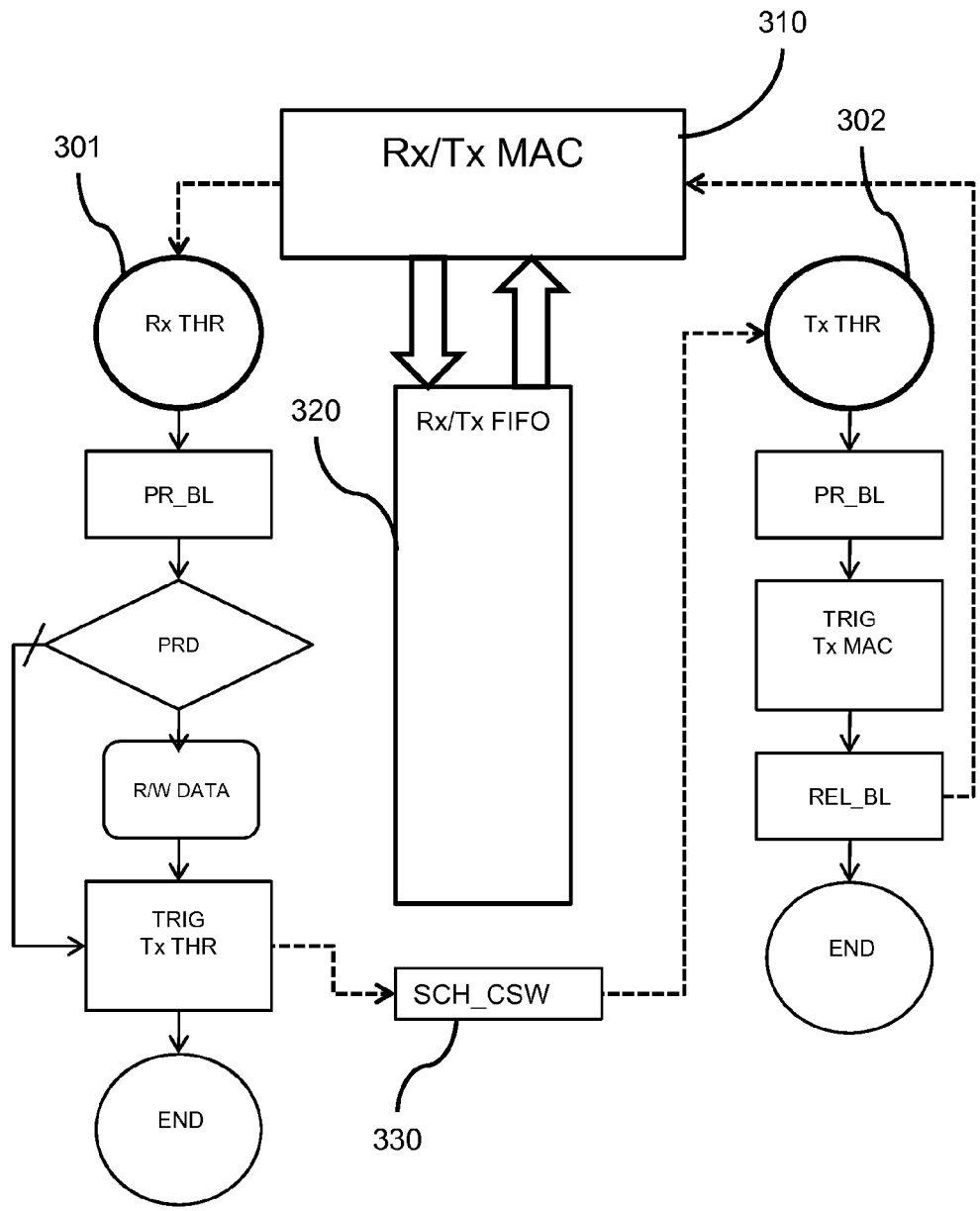
FIG. 3 shows an example of a system for controlling cut through forwarding via a shared FIFO buffer having a context switch.

FIG. 3 shows an example of a system for controlling cut through forwarding via a shared FIFO buffer having a context switch. The shared FIFO buffer 320 (Rx/Tx FIFO) is coupled to a combined input/output unit 310 (called Media Access Controller Rx/Tx MAC). The Figure shows an input control part 301 embodied by an Rx thread 301, and an output control embodied by a Tx thread 302. The Rx thread is initiated by a signal from the Rx/Tx MAC that a data segment has arrived and been transferred to the Rx/Tx FIFO. In a subsequent process called Process Block (PR_BL) the respective data segment is processed and attributes of metadata may be updated. In a decision process PRD the direction of processing is determined, and data may be unchanged, or read or written in process R/W DATA from/to internal registers or further peripheral circuitry (not shown). In a next step the processing of the transmission thread 302 may be triggered in block TRIG Tx THR. When the segment is ready for transmission the segment provides a signal to hardware scheduler context switch SCH_CSW 330. The switch is a hardware scheduler, which, in operation, functions as follows. The switch monitors activity of the processor and pending requests from threads, and assigns a priority pending request to the processor. If multiple pending requests are the same priority, the requests are assigned cyclically, called round robin.

It is noted that the frame receive time is unknown so there is no predetermined scheduling. The key requirement is that the processing time is scheduled for the worst case segment i.e. the most complex command and the worst offset in or between segments to be less than the time taken to receive a segment.

The output control embodied by a Tx thread 302 functions, in operation, as follows. First, in step Process Block PR_BL, the attributes of the segment are updated, e.g. to indicate the transmission state. Next, the output unit is activated to transfer the segment to the output unit and subsequently transmit the segment. Finally, the data of the segment is removed from the FIFO buffer by releasing the corresponding memory locations in the step marked REL_BL.

Figure 4:
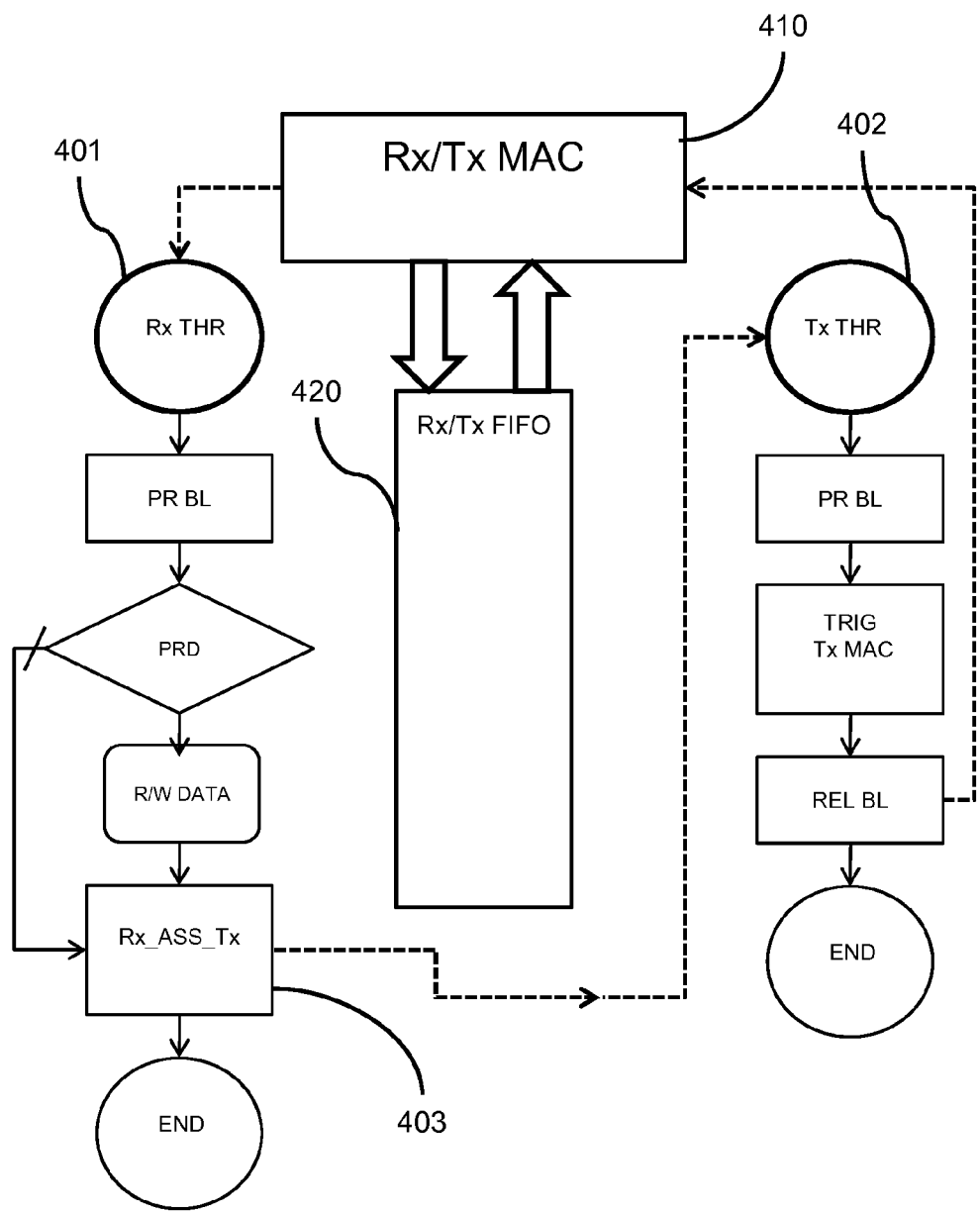
FIG. 4 shows an example of a system for controlling cut through forwarding via a shared FIFO buffer.

FIG. 4 shows an example of a system for controlling cut through forwarding via a shared FIFO buffer. The shared FIFO buffer 420 (Rx/Tx FIFO) is coupled to a combined input/output unit 410 (called Media Access Controller Rx/Tx MAC). The Figure shows an input control part 401 embodied by an Rx thread (Rx THR), and an output control 402 embodied by a Tx thread (Tx THR). The Rx thread is similar to the Rx thread 301 described above, but after processing the segment the processing is directed to block Rx_ASS_Tx 403, where the Rx thread assumes the Tx thread, i.e. the context switch is controlled by the program of the processor instead of the hardware scheduler. The Tx thread is substantially equal to the Tx thread described with FIG. 3. However, the Rx thread can change its context to any other thread, in this example that of the Tx thread. Basically it is emulating a hardware change of context but doing it more efficiently and more flexible as it's done in software and there's no overhead for hardware context loading/switching.

Figure 5:
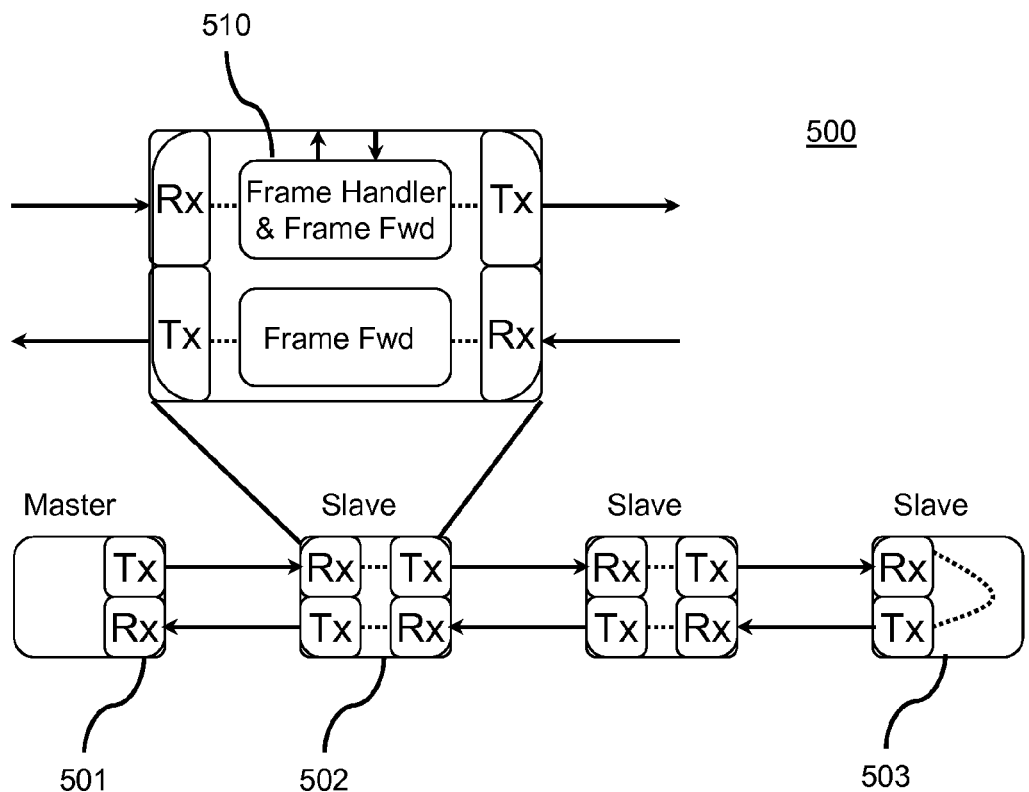
FIG. 5 shows a simplified block-diagram of a packet switched network with cut-through forwarding nodes.

FIG. 5 shows a simplified block-diagram of a packet switched network 500 with cut-through forwarding nodes 502. Node 501 is a master node which transmits data frames in an upstream direction to a chain of slave nodes 502. A transmitter unit Tx transmits the data frames. The data frames are prefixed with a preamble which is used by the physical layer to synchronize the receiving device with the transmitting device. The data frame further comprises a data packet after the preamble and/or SFD. The data packet comprises the actual data of the data frame. For example, after the preamble and SFD a maximum of 1518 bytes follow in an Ethernet data packet. The master node 501 also comprises a receiver unit Rx which receives a flow of downstream data frames from the chain of slave nodes 502. The slave nodes 502 are coupled in a chain and the last slave node 503 is a node for terminating the chain of slave nodes. Slave node 502 is shown in detail in the upper part of the Figure, and schematically indicates the structure of the Frame Handler and Frame Forward unit 510 in an upstream data path (left to right in the Figure). The slave nodes 502 have a second, downstream data path similar to the upstream data path, which enables such nodes to handle a bidirectional data stream. The master node 501 has a single transmitter TX and receiver Rx, and does not forward received frames. Also the terminating slave node 503 has a single transmitter TX and receiver Rx. Further devices may have three or more receiver/transmitter pairs and corresponding forwarding units for enabling more complex network architectures.

The slave nodes 502 receive the upstream data frames on their upstream receiver unit Rx from a previous node in the chain. The internal structure of the slave node has been described with reference to FIG. 1. Before the data packets of the data frames are completely received they are already forwarded to the upstream transmitter unit Tx which starts the transmission of the data frame comprising the data packets even before the whole data packet has been received. The upstream transmitter unit transmits the data frame to a subsequent node in the chain. The upstream of data packets may be monitored by an application processing thread in the processor 120 and data which is relevant for the specific slave node is processed by an application processing unit. If the application processing unit wants to transmit data to other nodes, it may insert data into specific locations of the upstream data packets which are forwarded by the slave node from the upstream receiver unit to the upstream transmitter unit. Slave nodes 502 do not generate data packets/frames themselves and only use the predetermined portions of the data packet or portions of the data packet that are calculated as results of decoding a command header within a data packet to transmit data to other units. The master unit 501 is, in the example of FIG. 5, the only node in the packet switched network 500 which generates new data packets/frames. The slave nodes 502 have also a downstream reception unit Rx at which they receive data frames from the subsequent node in the chain. The data packets of the received data frames are, without being inspected, forwarded to the downstream transmitter unit for transmission of the data frames to the previous node in the chain of nodes, as also indicated in the downstream data path. The downstream transmitter unit also starts the transmission of the data frames before the complete data packet of the corresponding data frame has been received by the downstream receiver unit. The slave node, which terminates the chain, has only an upstream receiver unit for receiving data frames from a previous node in the chain and a downstream transmitter unit for transmitting frames to the previous node in the chain. The data packets received in the data frames at the upstream receiver unit are forwarded to the downstream transmitter unit. The downstream transmitter unit starts transmitting the data packets in data frames before the complete data frame has been received by the upstream receiver unit. The forwarded data packets may be monitored by an application processing unit such that the slave node 503 is able to process data which is relevant for the application which are executed by the slave node and such that the slave node is able to transmit application data in specific locations of the forwarded data packets. It is to be noted that the slave node 503 may have, in other embodiments, and additional transmitter and receiver units. For example, the slave node may have the same hardware structure as slave nodes 502, but, because no additional Ethernet connection is coupled to the upstream transmitter unit and to the downstream receiver unit, the data packets received at the upstream receiver unit Rx are transferred to the downstream receiver unit Tx instead of being transferred to the upstream transmitter unit. This provides additional flexibility for setting up a specific network structure.

The topology of the packets switched network 500 is illustrative for the EtherCAT system which may be used to communicate information in a control automation technology, such as the control of a factory production line. The EtherCAT system allows the effective use of the bandwidth of the Ethernet system and because of the cut-through forwarding latency is reduced. To support a plurality of cut-through modes, a generic and flexible cut-through module is required as well as deterministic latency.

It is noted, that the frame is processed on the fly, and the slave node can be handling same frame on 2 ports concurrently. Moreover, latency and jitter are small and deterministic. The EtherCAT protocol is optimized for process data, which is transported directly within the Ethernet frame with a unique Ethertype. Finally, the frame length remains constant during forwarding.

The above apparatus and method provide deterministic forwarding latency and jitter in a cut through forwarding scheme while allowing the frame to be handled in software on the fly. This allows multiple protocols to be supported. The system enables cut-through packet forwarding that leads to deterministic latency and jitter by using a shared buffer (FIFO) architecture for the receive and transmit processing units, and one thread for the Rx and Tx routines. The system utilizes a programmable and configurable forwarding path that can be adapted to the requirements of the cut through mode and/or the cycle budget available on a RISC processor running the cut through mode software.

In a practical example, a hardware circuit terminates the physical interface by synchronizing on Ethernet's start of frame delimiter and then stores each byte into a Rx h/w FIFO. After segment size bytes have been received the h/w prefixes metadata and stores both the metadata and the data into the shared FIFO. The h/w then generates a request to a scheduler, which will subsequently trigger processing of this request to the RISC engine after the RISC has finished its current request or if it is currently idle. The RISC engine checks the metadata and the segments contents and processes accordingly. Meanwhile the hardware is busy storing more bytes into the Rx H/W FIFO though not enough yet to constitute another segment. The RISC engine changes context from the Rx to the Tx thread either directly in s/w or via a h/w mechanism (task switch). The RISC will then reformat the metadata region to that needed for the Tx segment and trigger transmission of that segment. Each segment must be processed in equal to or less time than the time taken to receive one segment. As an example at fast Ethernet rates, 100 Mbps, a segment size of 8 bytes yields a processing time of equal to or less than 640 ns and 4 bytes yields a 320 ns time frame. Further practical values for the segment size are 16 or 24 data bytes.

For the first segment of a frame the basic requirement is that this segment cannot be transmitted until the subsequent segment has been fully received. However if the segment size is small enough we can use the physical layer SFD (start of frame delimiter) plus preamble as a segment. The SFD plus preamble is eight bytes, if the segment size is eight bytes or less then we can trigger transmission of the first segment without waiting for the second segment to be received. The transmitter must transmit the preamble and SFD before it starts to transmit the data of the first segment, thereby giving sufficient time to process all subsequent segments. In the case where segment size equals preamble plus SFD this is complete before the subsequent segment is fully received. Thus there's never more than one segment stored in the shared FIFO at anytime in this case. This segment is a part of the frame, and not the whole frame. If segment size is 4 bytes then the SFD plus preamble constitutes two segments. In this case there will be two segments in the shared FIFO but the RISC process them one segment at a time via a separate request for each segment from the hardware FIFO.

It is noted that the order of segments cannot be changed as this would either violate the Ethernet protocol or would not allow the level of determinism needed (for example less than 1 µs forwarding latency and 100 ns of jitter). During processing, the Rx attribute is converted to the Tx attribute format by the RISC engine. The data within each segment may or may not be change, it depends on the protocol and the command being processed in this segment. For example a command that writes data from the frame into memory or registers on the receiving node would not require the data to be changed but would require it to be parsed understood and processed by the RISC engine. Conversely a command that reads data from a register or memory on the receiving node into the frame will require the frame data to change. Examples of the type of commands that must be processed on the fly are provided in chapter 2 of the document: "Hardware Data Sheet EtherCAT Slave Controller" mentioned above.

In summary, an input unit splits the frame into segments of known size in real time, which allows the latency and the processing requirements to be deterministically controlled for a specific application or protocol or specific RISC engine running at a specific frequency. The Rx unit passes the segments to the shared FIFO buffer. The input unit may prefix or append attributes (metadata) per segment that is both status and control for the Rx segment and the Tx segment. A processing entity is capable of triggering transmission of the segment in software, while a processor architecture with Rx and Tx threads is capable of triggering transmission. An output unit releases the FIFO entry holding the segment after transmission of the segment is complete. The effects of the system include: reducing the amount of memory for FIFO; reducing number of threads either physically or active; removing the need to copy data from a receive FIFO to a Tx FIFO; deterministic latency and jitter.

Furthermore, the system allows multi-protocol software to run on top of generic cut through scheme. A common scheme is provided for Rx and Tx to transfer status and control (attributes) to either software or underlying hardware.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Furthermore, the units and circuits may be suitably combined in one or more semiconductor devices.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:
1. An electronic device comprising:
   a first input unit and a first output unit configured to communicate with other devices according to a network protocol via a communication medium, the network protocol defining data packets comprising data bytes having a predetermined structure including a packet header;

a first processor configured to perform input control on incoming data packets and perform output control on outgoing data packets;

a first in first out (FIFO) buffer comprising a multiuser memory, the input of the first FIFO buffer being coupled to the first input unit and the output of the first FIFO buffer being coupled to the first output unit, the first FIFO buffer being shared between the input control and the output control via the multiuser memory, wherein the first input unit is arranged to
receive input data comprising incoming data packets from the communication medium,
detect the start of a respective data packet,
subdivide the data bytes of the respective data packet into consecutive segments, one segment having a predetermined number of data bytes, and
transfer the segment to the first FIFO buffer before the next segment has been completely received;

the first processor is arranged to
in the input control, access the multiuser memory for processing the segment, and
in the output control, initiate outputting the output packet before the corresponding input data packet has been completely received; and the first output unit is arranged to
transfer the segment from the first FIFO buffer to the first output unit, and
transmit the segment to the communication medium.

2. The device as claimed in claim 1, wherein
the first input unit is arranged to
prefix metadata to the segment, and
transfer the metadata with the segment to the first FIFO buffer; and
the first processor is arranged to process the metadata.

3. The device as claimed in claim 1, wherein the incoming packets correspond to data on a Data Link layer according to an International Organization for Standardization (ISO) layer 2 network protocol.

4. The device as claimed in claim 1, wherein the start of a respective data packet is after a preamble and Start of Frame Delimiter (SFD) on the physical layer according to an International Organization for Standardization (ISO) layer 1 network protocol.

5. The device as claimed in claim 1, wherein the segments have a size of 8, 16 or 24 data bytes.

6. The device as claimed in claim 1, wherein the first processor is a reduced instruction set computer (RISC) processor.

7. The device as claimed in claim 1, wherein the input control comprises a receiver thread and the output control comprises a transmitter thread.

8. The device as claimed in claim 1, wherein the first processor is arranged to convert a receive attribute of incoming data into a transmit attribute.

9. The device as claimed in claim 1, wherein the first processor is arranged to change data bytes in a segment depending on a command in the data packet being processed.

10. The device as claimed in claim 9, wherein the first processor is arranged to process a command that writes data from the incoming packet into a memory or register in the device by parsing and analyze the incoming packet, or a command that reads data from a register or memory in device by changing the data bytes in the outgoing packet.

11. The device as claimed in claim 1, wherein the device comprises a hardware scheduler arranged to monitor activity of the first processor and pending requests from threads, and to assign a priority pending request to the first processor or round robin if multiple pending requests are the same priority.

12. The device as claimed in claim 1, wherein the device is a slave node device.

13. The device as claimed in claim 1, wherein the device has a second input unit, second output unit, second FIFO buffer coupled to the first processor, the second input unit, second output unit and second FIFO buffer being arranged equal to said first input unit, first output unit and first FIFO buffer.

14. The device as claimed in claim 1, wherein the device has a second input unit and a second output unit, a second FIFO buffer and a second processor, the second input unit, second output unit, second FIFO buffer and second processor being arranged equal to said first input unit, first output unit, first FIFO buffer and first processor.

15. The device as claimed in claim 1, wherein the device comprises a data handling unit, and the first processor is arranged to control transferring of segments of a data packet from the first FIFO buffer to the data handling unit.

16. The device as claimed in claim 1, wherein the device comprises a data handling unit, and the processor is arranged to control transferring of segments of a data packet from the data handling unit into the first FIFO buffer.

17. The device as claimed in claim 1, wherein the network protocol is Ethernet for Control automation Technology (EtherCAT).

18. An integrated circuit comprising at least one electronic device according to claim 1.

19. A method of communicating between electronic devices, the device comprising:
an input unit and an output unit for communicating with other devices according to a network protocol via a communication medium, the network protocol defining data packets comprising data bytes having a predetermined structure including a packet header;
the method comprising
performing input control on incoming data packets and performing output control on outgoing data packets;
the device comprising
a first in first out (FIFO) buffer comprising a multiuser memory, the input of the FIFO buffer being coupled to the input unit and the output of the FIFO buffer being coupled to the output unit, the FIFO buffer being shared between the input control and the output control via the multiuser memory; and
the method comprising
receiving input data comprising incoming data packets from the communication medium,
detecting the start of a respective data packet,
subdividing the data bytes of the respective data packet into consecutive segments, one segment having a predetermined number of data bytes,
transferring the segment to the FIFO buffer before the next segment has been completely received,
in the input control, accessing the multiuser memory for processing the segment,
in the output control, initiating outputting the output packet before the corresponding input data packet has been completely received,
transferring the segment from the FIFO buffer to the output unit, and
transmitting the segment to the communication medium.

20. The method as claimed in claim 19, wherein the incoming packets correspond to data on a Data Link layer according to an International Organization for Standardization (ISO) layer 2 network protocol.

* * * * *